United States Patent [19]

Mangiere et al.

[11] 3,769,027

[45] Oct. 30, 1973

[54] DRY POWDER FOR GLAZING FOODSTUFFS

[76] Inventors: Richard John Mangiere, 101 Busteed Dr., Midland Park, N.J. 07432; Charles James Dwyer, 100 Hepburn Rd., Clifton, N.J. 07012; Magdalena Adriana Bressler, 302 High St., Fairlawn, N.J. 07410

[22] Filed: Mar. 11, 1971

[21] Appl. No.: 123,411

[52] U.S. Cl. .............................. 99/1, 99/166, 99/169
[51] Int. Cl. ................................................ A23b 1/10
[58] Field of Search ..................... 99/166, 169, 102, 99/1, 142

[56] References Cited
UNITED STATES PATENTS

| | | | |
|---|---|---|---|
| 3,395,024 | 7/1968 | Earle | 99/169 |
| 2,861,889 | 11/1958 | Carman | 99/102 |
| 2,786,764 | 3/1957 | Rivoche | 99/169 |
| 2,517,595 | 8/1950 | Owens et al. | 99/166 |
| 3,695,933 | 10/1972 | Deaton | 99/142 |
| 3,560,343 | 2/1971 | Armbruster et al. | 99/142 |
| 3,653,924 | 4/1972 | Penton | 99/168 |

*Primary Examiner*—Morris O. Wolk
*Assistant Examiner*—Stephen B. Davis
*Attorney*—Frank E. Robbins, Janet E. Price, Joseph Shekleton, Dietmar H. Olesch and Dorothy R. Thumler

[57] ABSTRACT

An edible powder containing a water-soluble starch hydrolyzate having a D.E. within the range of 5 to 25, fat, algin, a food-grade phosphate, a food-grade source of calcium, and flavoring materials. The powder is coated onto uncooked foodstuffs such as meat. During cooking the powder forms a continuous film or coating having a glazed appearance around the foodstuff.

13 Claims, No Drawings

DRY POWDER FOR GLAZING FOODSTUFFS

This invention relates to a dry product for use as a combination coating and glaze for meat and the like.

Coating or breading compositions for meat and other foodstuffs are well known; they have, of course, been prepared in the home for generations, and recently commercially prepared compositions have been introduced on the market. In use, the commercial products are spread on the raw meat (e.g., by shaking the meat and the coating composition together in a bag), after which the coated meat is baked in an oven. During the cooking operation the coating composition forms a crisp crust upon the meat, which not only gives the meat an attractive appearance and texture but also seals in the juices of the meat during cooking, keeping the meat moist and tender.

Glazes, i.e., compositions which impart an attractive luster, or "shine," to a food product, have also long been known. They are generally liquid products such as syrups, e.g., mixtures of sugar, water or fruit juice, plus seasonings if desired. Suitably flavored liquid glazes are sometimes used to baste meat during roasting or barbecuing, or near the end of the cooking operation, to impart flavor, luster, and moisture to the meat.

We have developed a dry composition which acts as a coating, a seasoning, and a glaze for food products. To use the composition the consumer merely applies it to the raw footstuff, as by placing the composition and the foodstuff in a bag and shaking them together, and then baking the coated foodstuff in an oven for the requisite amount of time. Preferably the foodstuff is kept uncovered during the baking operation, and can be baked on a flat utensil such as a cookie sheet, or in an uncovered roasting pan, casserole dish, or the like. Preferably, the foodstuff is turned once, about half way through the baking operation. During the baking a lustrous, soft (not crisp or "crust-like") film forms over the entire surface of the foodstuff. The film gives to the foodstuff an extremely attractive glazed appearance and also acts as a barrier to keep the moisture contained in the foodstuff from escaping. Furthermore, because flavoring materials, and optionally edible coloring materials, are contained in the composition, it additionally imparts flavor and color to the cooked foodstuff.

The object of the present invention is to prepare a dry, edible powder for application to foodstuffs, which will form a lustrous film-like coating around the foodstuff during cooking.

Another object is to prepare an edible powder for application to foodstuffs which will coat the foodstuff with a continuous film during cooking, thereby preventing the escape of natural moisture from the foodstuff.

An additional object is to provide an edible powder for application to foodstuffs, which will impart to the foodstuffs, during the cooking of same, an attractive glazed appearance and an extremely appetizing flavor.

The composition of the invention, which we shall refer to as a glaze powder, comprises a blend of the following dry ingredients. All percentages throughout the specification and in the appended claims are by weight, based on the total weight of the glaze powder, unless stated otherwise.

1. Between about 30 percent and about 60 percent of a water-soluble low D.E. starch hydrolyzate, having a D.E. within the range of 5 to 25;
2. Between about 4 percent and about 10 percent fat;
3. Between about 0.25 percent and about 1.5 percent algin;
4. Between about 0.1 percent and about 0.95 percent of a food-grade phosphate;
5. A sufficient amount of a food-grade source of calcium to provide between about 0.01 percent and about 0.015 percent available calcium; a derivative of milk, such as Whey is best suited for this purpose;
6. Between 0 percent and about 15 percent corn syrup solids;
7. Between 0 percent and about 1.0 percent of a food-grade emulsifier and water-binding agent, preferably lecithin;
8. The balance comprising a member selected from the group consisting of flavoring materials and mixtures of flavoring materials and coloring materials.

The following observations were made during the cooking of cut-up chicken parts, coated with the glaze powder of the invention, in a 400° F oven. Near the beginning of the cooking period a glaze, which had almost crust-like appearance, formed on the top surface of the chicken parts. After 15 minutes baking time the chicken parts were turned over and baked an additional 15 minutes, then removed from the oven. The crust-like appearance was gone and a uniform, lustrous, extremely attractive glaze covered both sides of the chicken. The chicken had a delicious flavor and an extremely appetizing, moist texture. (The actual baking time depends upon the size of the chicken parts.)

Although we are not certain of the exact mechanism of the formation of the glaze during the cooking operation, it is our opinion, based upon observations of the meat and glaze powder during cooking, that the glaze is achieved according to the following hypothesis.

The oven temperature melts the low D.E. starch hydrolyzate, as well as the corn syrup solids if such are used, releasing inherent moisture therefrom. The process of cooking also releases moisture from the meat. Sufficient moisture is released to dissolve the algin, the phosphate and the calcium source. At this point a number of mixed reactions probably take place.

1. Heat and the phosphate permit the algin to go smoothly into solution.
2. A compound solution of dissolved low D.E. starch hydrolyzate, corn syrup solids (if present), algin and the calcium source is formed.
3. Heat causes partial coagulation of the calcium source, causing the solution to thicken.
4. The sequestering power of the phosphate is overcome and calcium ions from the calcium source (and perhaps from the meat) bridge the sequestrant and complex with the algin to form crosslinking and gel formation.

The resultant gel is considered an irreversible gel. It will not melt when heated and it has the properties of remix-reset, that is to say, the gel can be physically disturbed by mixing and will reset to a smooth gel, or film.

We shall now discuss the individual ingredients of the glaze powder, and the requisite proportions of same, in detail.

Ingredient (1), the low D.E. starch hydrolyzate, can be any product prepared by hydrolyzing starch, provided the product has a dextrose equivalent (D.E.) within the range of 5 to 25, is in dry, as opposed to liquid or syrup, form (a moisture content of about 5 percent is preferred), and is substantially completely water-soluble. Products of this type are sometimes referred to as malto dextrins, and are readily available commercially.

Low D.E. starch hydrolyzates can be prepared from a variety of starchy materials, including cereal starches, waxy starches, and/or root starches. They are generally prepared by treating the starch with a suitable hydrolyzing enzyme (e.g., a bacterial alpha-amylase), with acid, or with a combination of acid and enzyme. In addition to the D.E. and solubility characteristics of the hydrolyzate, a further desirable, but not necessary, feature is that the ratio of the sum of the percentages (dry basis) of saccharides contained in the hydrolyzate having a degree of polymerization of 1 to 6, divided by the D.E., be greater than 2.0.

Suitable commercially available low D.E. starch hydrolyzates of the type described above include, for example, those sold by CPC International Inc. under the name MOR-REX hydrolyzed cereal solids.

The low D.E. starch hydrolyzate should be present in an amount within the range of between about 30 percent and 60 percent (by weight, based on the weight of the total glaze powder), and preferably is present in an amount of at least 45 percent to 50 percent. The preferred range is between about 54 percent and about 57 percent.

A low D.E. starch hydrolyzate, within the proportions set forth, is an essential ingredient of the glaze composition. Attempts to replace all or a substantial portion of this ingredient with other water-soluble saccharides were unsuccessful; the resulting powders caramelized and burned on the meat and on the pan during baking. No glaze was formed, just a heavy sticky syrup. If, on the other hand, the glaze powder contains more than about 60 percent low D.E. starch hydrolyzates, the hydrolyzate does not dissolve completely during the baking operation and again a satisfactory glaze is not formed on the foodstuff.

Ingredient (2), the fat, can be any edible fat or oil, in liquid, semi-solid or spray dried form, e.g., a liquid vegetable oil, a partially or completely hydrogenated vegetable oil, an animal fat, or the like. The glaze composition should contain between about 4 percent and about 10 percent fat, and preferably contains at least about 6 percent fat.

By the term "algin," ingredient (3), is meant any food-grade form of sodium alginate. The algin should be present in an amount within the range of between about 0.25 percent and about 1.5 percent, about 0.75 percent being preferred. The presence of a sodium alginate is necessary to the formation of a satisfactory film, or gel, around the foodstuff during the cooking, and furthermore assists in preventing undesirable darkening of the film, which darkening gives the cooked, glaze foodstuff an unappetizing appearance.

It is necessary that a small amount of a food-grade phosphate, ingredient (4), be present in the glaze composition. Initially, the phosphate sequesters the calcium ions permitting the algin to go into solution. Such compounds as disodium phosphate, trisodium phosphate, tetrasodium pyrophosphate, and the like are all suitable. The phosphate salt should be present in an amount of at least about 0.1 percent. Less than 1.0 percent should be present (about 0.95 percent is a practical upper limit), because 1.0 percent or more is not only unnecessary, but it is likely to impart an undesirable flavor to the foodstuff. About 0.25 percent is the preferred amount of phosphate.

A food-grade source of calcium, ingredient (5), in an amount sufficient to provide about 0.010 to 0.015 percent available calcium, is also necessary for the formation of a satisfactory film. As has been stated previously, we believe that the calcium ions bridge the sequestrant and complex with the algin to form cross-linking and gel formation. A suitable, and preferred, calcium source is edible casein. Another suitable calcium source is a commercially available whey powder which has a relatively high calcium content (about 1.3 percent calcium), sold by Purity Products Co., Mayville, Wisconsin, under the name LACTO PURITEIN LP 10 lactose reduced modified whey solids. A typical analysis of this whey powder is as follows:

| Protein (80% lactalbumin) | 28.0% (minimum) |
|---|---|
| Lactose | 51% |
| Ash | 10% |
| Sodium | 1.3% |
| Potassium | 1.9% |
| Calcium | 1.3% |
| Magnesium | 0.2% |
| Phosphorus | 1.3% |
| Fat | 1.5% |
| Moisture (free) | 2.5% |
| Lactate | 1.0% |
| Citrate | 4.8% |

It should be noted that algin (sodium alginate) is available in many grades and various viscosities. 1 percent solutions can have viscosity ranges from 10 to 1,200 centipoises depending on which sodium alginate and in what system it is used. Depending upon the grade of sodium alginate used, the stoichemetric reaction of calcium ions and algin is 75 mg.$Ca^{++}$ for each gram of algin. Desirable gels and films can be formed using 40 percent of the stoichemetric amount of calcium, but this figure can be modified by changes and adjustments in the sequestrants, pH and saccharide levels. The sodium alginate used in the examples of this application was supplied by the Kelco Company, 75 Terminal Avenue, Clark, New Jersey 07066 and is sold under the trade name of KELTONE. KELTONE is classified as a high viscosity product, i.e., a 1 percent solution has a viscosity of 400 centipoises. When using this type of algin, in an amount of about 0.75 percent, about 1 percent of edible casein or a high calcium whey powder is suitable. Obviously, grades of sodium alginates with higher or lower viscosities would require proportionately higher or lower amounts of calcium.

An optional but preferred ingredient is corn syrup solids, ingredient (6), in an amount of up to about 15 percent, preferably about 8 percent. Although a satisfactory product can be prepared without corn syrup solids, their inclusion improves the general texture and sheen or luster of the glaze. If the glaze contains more than about 15 percent corn syrup solids the glaze will burn, or caramelize, during the cooking operation. Furthermore, it is preferred, particularly if more than about 10 percent corn syrup solids is present in the composition, that the corn syrup soids not be of the so-called "high conversion" type, having D.E.'s of 58 or greater; lower D.E. corn syrup solids, i.e., those having a D.E. of less than 58, are preferred. The higher D.E. corn syrup solids, particularly if used in an amount in excess of about 10 percent, cause an undesirable darkening of the glaze during cooking.

Another optional ingredient is a food-grade emulsifier, which furthermore has the property of acting as a water-binding agent, such as lecithin. The inclusion of such an ingredient does not affect the formation of the glaze itself, but it does prevent the glazed food product from sticking to the cooking utensil during baking. If an ingredient such as lecithin is not included in the glaze powder, the consumer must either grease the cooking utensil or employ one with a "non-stick" surface, e.g., a Teflon coated utensil. Lecithin can be incorporated into the glaze powder in an amount of up to about 1.0 percent of the total composition; an amount of about 0.5 percent is sufficient to prevent the coated foodstuff from sticking to an ungreased, conventional cooking utensil, and this amount is preferred. More than 1.0 percent should not be employed, because an excessive amount of lecithin or the like will inhibit the melting of the starch hydrolyzate, and an unsatisfactory film results.

Substantially all of the remainder of the glaze powder, which can be within the range of about 10 percent and about 65 percent, but which is preferably within the range of about 25 percent and 30 percent of the total weight of the powder, should be flavoring materials plus, if desired, coloring materials. By the term "flavoring materials" is meant those food-grade materials conventionally employed to impart flavor to a foodstuff or to enhance the flavor of a foodstuff, including natural and/or imitation flavorings, seasonings, spices salt, condiments, flavor enhancers such as monosodium glutamate, disodium inosinate, disodium guanylate, etc. Small amounts of food-grade coloring materials, such as caramel color, can also be incorporated into the glaze powder.

The purpose of the flavoring materials is two-fold; obviously they add flavoring to the glaze powder and to the cooked, glazed foodstuff, but they additionally perform a second essential function, namely that of a diluent. Surprisingly, it has been found that a glaze powder consisting of only ingredients (1) through (5), or (1) through (6), will not form a satisfactory film. Incorporation of flavoring materials, on the other hand, in the proportions specified, results in a powder which will completely coat and glaze the foodstuff during cooking in the desired manner. It is conceivable that materials other than flavoring materials could be employed as diluents. However, such materials would have to be edible, water-soluble, either completely tasteless or having a taste which would not interfere deleteriously with the taste of the coated foodstuff, and furthermore would not interfere with the formation of the film. The use of sugars, e.g. sucrose, dextrose, excess corn syrup solids or low D.E. starch hydrolyzates would result in burning, caramelization, undue darkening, and/or lack of film formation altogether. An excess of bland-tasting fats would also prevent the formation of a satisfactory film. Because flavoring materials, as hereinbefore defined, both function as satisfactory diluents and furthermore impart desirable flavor characteristics to the product, they are preferred in the formulation. The specific flavoring ingredients are variable and can be changed contingent upon the type of flavor desired; as will be noted from the examples, flavor changes have no significant effect on the glaze formation.

One or more colloidal gums, in addition to the algin, may also be incorporated into the glaze powder if desired. Incorporation of an additional vegetable gum, in a small amount, improves somewhat the adhesion of the film to the foodstuff. Selection of a suitable additional gum will depend upon the oven temperature to be employed during the cooking operation, because the gum must be one which will dissolve in aqueous media at that temperature. Xanthan gum has been employed, with good results, in glaze powders designed for use in coating chicken or other fowl. It is rational to assume other colloidal gums, such as carboxymethyl cellulose or Gum Acacia would function in the glaze powder in the same manner as Xanthan gum. By colloidal gum we refer to the series of products that will dissolve in water and form clear colloidal solutions. The addition of such a product will result in a clear glaze. On the other hand, gums such as gum tragacanth are not satisfactory for a glaze product. Such products are not true colloids but merely thickening agents, they swell and thicken in aqueous media. The addition of such a gum, to the glaze powder, would result in an unsatisfactory opaque glaze.

Preparation of the glaze powder is extremely simple, as it merely involves mixing together the dry ingredients. The product can be packaged and distributed as any food powder, e.g., in heat sealed, foil lined paper bags. The glaze powder is shelf-stable at room temperature; no refrigeration is required.

The following examples will illustrate the practice of the invention. They are presented for illustrative purposes only, and should not be construed as limiting the scope of the invention in any way.

EXAMPLE I

A. The following ingredients were blended together:

| Ingredients | | Parts by Weight |
|---|---|---|
| 10 D.E. starch hydrolyzate | | 56.00 |
| Fat (spray dried vegetable fat) | | 6.00 |
| Algin | | 0.75 |
| Tetrasodium pyrophosphate | | 0.25 |
| Edible casein (spray dried) | | 1.00 |
| Corn syrup solids (42 D.E.) | | 8.00 |
| Flavoring materials: | | |
|    Salt | 6.00 | |
|    Barbecue oil | 0.12 | |
|    Imitation smoke flavor | 1.50 | |
|    Seasoning powder | 1.50 | |
|    Worcestershire sauce | 10.00 | |
|    Onion powder | 4.00 | |
|    Garlic powder | 0.50 | |
|    Monosodium glutamate | 5.00 | |
|    Mixture of disodium inosinate and disodium guanylate | 0.12 | |
|    Total flavoring materials: | | 28.74 |
| Total Ingredients | | 100.74 |

All of the above listed ingredients were commercially available products. Two and three-fourths ounces of the mixture were placed in a plastic bag, and 2-½ pounds of moist, cut-up chicken parts were added. The bag was shaken until the chicken parts were evenly coated. The chicken parts were placed on a foil lined, lightly greased cookie sheet and baked in a 400° F oven for 15 minutes, after which the parts were turned and baked for an additional 15 minutes. The cooked chicken was completely covered with an attractive lustrous glaze. The chicken had a delicious "barbecued" flavor, and an extremely moist, appetizing texture.

The example was repeated several times, with the ingredient variations set forth below. In all cases the resulting cooked chicken was rated excellent with respect to appearance, flavor and texture.

B. Sixty parts of starch hydrolyzate and 4 parts corn syrup solids were employed.

C. The starch hydrolyzate was reduced to 50 parts and the corn syrup solids increased to 14 parts. In this example the flavor and texture of the chicken were the same as in the previous example, but the glazed coating was substantially darker in appearance, which darkening was considered somewhat unattractive. This example illustrates the fact that 15 percent is approximately the upper limit for the corn syrup solids ingredient.

D. The algin was increased to 1.5 percent, the tetrasodium pyrophosphate increased to 0.75 percent, the fat increased to 9.0 percent, and the Worcestershire sauce decreased to 5.0 percent.

E. The fat was reduced to 4.0 percent and the corn syrup solids increased to 10.0 percent.

F. & G. Disodium phosphate and trisodium phosphate were substituted for the tetrasodium pyrophosphate.

EXAMPLE II

The following ingredients, all of which were commercially available products, were mixed together:

| Ingredients | | Parts by Weight |
|---|---|---|
| 5 D.E. starch hydrolyzate | | 56.00 |
| Fat (spray dried vegetable fat) | | 6.00 |
| Algin | | 0.75 |
| Tetrasodium pyrophosphate | | 0.25 |
| Spray dried whey solids (1.3% calcium) | | 1.00 |
| Corn syrup solids | | 8.00 |
| Xanthan gum | | 0.16 |
| Flavoring and coloring materials: | | |
| Salt | 8.25 | |
| Barbecue oil | 0.12 | |
| Imitation smoke flavor | 1.12 | |
| Seasoning powder | 1.00 | |
| Worcestershire sauce | 5.00 | |
| Onion powder | 4.00 | |
| Garlic powder | 0.50 | |
| Chicken flavored soup base and stock booster | 2.00 | |
| Monosodium glutamate | 5.00 | |
| Disodium inosinate and disodium guanylate | 0.12 | |
| Caramel color | 0.75 | |
| Total flavoring and coloring materials | | 27.86 |
| Total ingredients | | 100.02 |

The resultant mixture was used to coat moist cut-up turkey parts and the turkey was baked, on a lightly greased foil lined cookie sheet at 400° F for about 45 minutes; the turkey was turned once about half way through the baking cycle. The cooked turkey had a delicious flavor and an extremely moist, appetizing texture. The turkey parts were completely and evenly coated with a lustrous, attractive glazed film. The film was slightly firmer, and adhered to the turkey parts somewhat more tenaciously, than did the films prepared in accordance with Example I. This example indicates that the incorporation of a small amount of an additional vegetable gum, in this case xanthan gum, improves slightly the properties of the film.

EXAMPLE III

In the previous examples it was necessary to employ a greased utensil for baking the foodstuff; use of a non-greased utensil resulted in the coated foodstuff sticking to the utensil, with attendant loss of some of the coating. In this example a small amount of lecithin was added to the glaze powder. The following ingredients were blended together.

| Ingredients | | Parts by Weight |
|---|---|---|
| 19 D.E. starch hydrolyzate | | 55.00 |
| Fat (liquid vegetable oil) | | 6.00 |
| Algin | | 0.75 |
| Tetrasodium pyrophosphate | | 0.25 |
| Edible casein | | 1.00 |
| Corn syrup solids | | 8.00 |
| Xanthan gum | | 0.16 |
| Lecithin | | 1.00 |
| Flavoring and coloring materials: | | |
| Salt | 8.25 | |
| Barbecue oil | 0.12 | |
| Imitation smoke flavor | 1.12 | |
| Seasoning powder | 1.00 | |
| Worcestershire sauce | 5.00 | |
| Onion powder | 4.00 | |
| Garlic powder | 0.50 | |
| Chicken flavored soup base and stock booster | 2.00 | |
| Monosodium glutamate | 5.00 | |
| Disodium inosinate and disodium guanylate | 0.12 | |
| Caramel color | 0.75 | |
| Total flavoring and coloring materials | | 27.86 |
| Total ingredients | | 100.02 |

The powder was used to coat moist cut-up chicken parts, and the chicken was placed on an ungreased foil lined cookie sheet and baked as in Example I. At the end of the cooking period the chicken parts could be easily removed from the foil lining, without any of the coating sticking to the foil. The cooked chicken was excellent with respect to appearance, flavor and texture.

The example was repeated, except the lecithin was reduced to 0.50 part and the casein increased to 1.50 part. Again, the chicken did not adhere, or stick, to the ungreased foil, and was identical in flavor, texture and appearance to that of the previous batch.

EXAMPLE IV

In this example a tomato flavor glaze was prepared. The example illustrates the fact that the specific flavoring ingredients can be varied as desired, without affecting the properties of the film itself.

The following ingredients were blended together:

| Ingredients | | Parts by Weight |
|---|---|---|
| 15 D.E. starch hydrolyzate | | 56.00 |
| Fat (margarine) | | 6.00 |
| Algin | | 0.75 |
| Tetrasodium pyrophosphate | | 0.25 |
| Edible casein | | 1.00 |
| Corn syrup solids | | 8.00 |
| Flavoring materials: | | |
| Salt | 6.00 | |
| Barbecue oil | 0.12 | |
| Hickory smoke flavor (imitation) | 0.15 | |
| Imitation tomato flavor | 1.00 | |
| Catsup powder | 10.00 | |
| Worcestershire sauce | 3.00 | |
| Chicken flavored soup base and stock booster | 1.50 | |
| Onion powder | 4.00 | |
| Garlic powder | 0.50 | |
| Monosodium glutamate | 2.00 | |
| Disodium inosinate and disodium guanylate | 0.12 | |
| Paprika | 0.12 | |
| Total flavoring materials | | 28.51 |
| Total ingredients | | 100.51 |

Chicken parts were coated with the mixture and cooked as in Example I. The cooked chicken parts were completely and evenly coated with an attractive lustrous reddish-colored glaze. The flavor and moist texture of the cooked chicken parts were excellent.

EXAMPLE V

In this example the ingredients of the glaze powder were employed in varying proportions, illustrating the fact that the ingredients can be employed to prepare satisfactory glaze powders at the upper and lower limits of their respective proportions.

A. The following ingredients were mixed together:

| Ingredients | Parts by Weight |
|---|---|
| 10 D.E. starch hydrolyzate | 58.00 |
| Fat (liquid vegetable oil) | 10.00 |
| Algin | 1.25 |
| Tetrasodium pyrophosphate | .70 |
| Edible casein | 1.50 |
| Corn syrup solids | 12.00 |
| Flavoring materials (approximately the same materials, and in the same proportions, as in Example II) | 16.55 |
| Total ingredients | 100.00 |

B. A second glaze powder was prepared by mixing the following ingredients:

| Ingredients | Parts by Weight |
|---|---|
| 10 D. E. starch hydrolyzate | 40.00 |
| Fat (liquid vegetable oil) | 4.00 |
| Algin | 0.25 |
| Tetrasodium pyrophosphate | 0.10 |
| Edible casein | 0.75 |
| Corn syrup solids | 6.00 |
| Flavoring materials (approximately the same materials, and in the same proportions, as in Example II) | 48.90 |
| Total ingredients | 100.00 |

Cut-up chicken parts were coated with powders A and B, and cooked as in Example I.

Both powders formed satisfactory glazes. However, in the case of powder A, there was a certain amount of "run-off" of the saccharides and the oil onto the pan during cooking, which resulted in charring. The flavor of the cooked chicken was at the low end of the acceptance level. The glaze itself, although even and attractive in appearance, had a fairly "chewy" texture, which was considered somewhat undesirable when compared to the smooth textures of the glazes prepared in accordance with the previous examples.

The glaze resulting from powder B was less evenly distributed than those from previous formulations, and showed rather poor adhesion to the chicken. As could be expected, the flavor level was considered somewhat excessive for the average taste.

EXAMPLE VI

In this example a glaze powder was prepared without corn syrup solids. The following ingredients were mixed together:

| Ingredients | Parts by Weight |
|---|---|
| 10 D.E. starch hydrolyzate | 60.00 |
| Fat (spray dried vegetable fat) | 10.00 |
| Algin | 0.75 |
| Tetrasodium pyrophosphate | 0.25 |
| Edible casein | 1.00 |
| Flavoring materials | 28.00 |
| Total ingredients | 100.00 |

The product formed an even glaze on cooked chicken parts, and the cooked chicken was characterized by excellent flavor and moist texture. However, the glaze had less sheen (which is normally associated with a glazed food product) than glazes prepared with corn syrup solids.

This example illustrates the fact that although a perfectly acceptable product can be prepared without corn syrup solids, the inclusion of corn syrup solids is nevertheless desirable from the standpoint of appearance of the cooked foodstuff.

EXAMPLE VII

This example illustrates various unacceptable products, and demonstrates the criticality of various essential ingredients of the glaze powder.

A. In this glaze powder the "film-forming" ingredients, i.e., the algin, phosphate, and calcium source, were omitted. The following ingredients were mixed together:

| Ingredients | Parts by Weight |
|---|---|
| 10 D.E. starch hydrolyzate | 58.00 |
| Fat (spray dried vegetable fat) | 10.00 |
| Corn syrup solids | 8.00 |
| Flavoring materials | 24.00 |
| Total ingredients | 100.00 |

Cooked chicken coated with the glaze powder had an attractive, lustrous glazed appearance. However, there was no actual film formation, and the cooked chicken was very dry and tough in texture, indicating a substantial loss of moisture.

B. In this example an "unseasoned" glaze powder was prepared, wherein substantially all of the flavoring materials were eliminated. The following ingredients were mixed together:

| Ingredients | Parts by Weight |
|---|---|
| 10 D. E. starch hydrolyzate | 67.50 |
| Fat | 9.00 |
| Algin | 0.75 |
| Tetrasodium pyrophosphate | 0.25 |
| Edible casein | 1.00 |
| Corn syrup solids | 13.50 |
| Salt | 5.00 |
| MSG | 3.00 |
| Total | 100.00 |

The resulting product was unacceptable in that although a glaze formed it charred (because of the high saccharide level) before the cooking cycle was completed. The chicken had a slightly burned flavor, in addition to tasting "flat," i.e., unseasoned.

C. In this example an excess amount of an additional vegetable gum (in this case gum acacia) was employed in the glaze powder. The following ingredients were mixed together:

| Ingredients | Parts by Weight |
|---|---|
| 10 D.E. starch hydrolyzate | 56.00 |
| Fat | 6.00 |
| Algin | 0.75 |
| Tetrasodium pyrophosphate | 0.25 |
| Edible casein | 1.00 |
| Corn syrup solids | 8.00 |
| Gum acacia | 2.00 |
| Flavoring materials | 26.00 |
| Total ingredients | 100.00 |

The resulting product was unacceptable in that it formed a crust rather than a film. The chicken was "chewy" and had a gummy mouthfeel.

Apparently the excess vegetable gum retarded the melt down of the starch hydrolysate and corn syrup solids, preventing the formation of a satisfactory film.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A dry product suitable for coating and glazing foodstuffs during the cooking thereof consisting essentially of a blend of the following ingredients:
   1. between about 30 percent and about 60 percent of a water-soluble starch hydrolyzate having a D.E. within the range of 5 and 25;
   2. between about 4 percent and about 10 percent fat;
   3. between about 0.25 percent and about 1.5 percent algin;
   4. between about 0.1 percent and about 0.95 percent of a food-grade phosphate;
   5. a sufficient amount of a food-grade source of calcium to provide between about 0.01 percent and about 0.015 percent available calcium;
   6. between 0 percent and about 15 percent corn syrup solids;
   7. between 0 percent and about 1.0 percent of a food-grade emulsifying and water-binding agent;
   8. the balance of the composition comprising a member selected from the group consisting of flavoring materials and mixtures of flavoring materials and coloring materials.

2. A product in accordance with claim 1 wherein:
   1. said water-soluble starch hydrolyzate is present in an amount between about 54 percent and about 57 percent;
   2. said fat is present in an amount between about 6 percent and about 10 percent;
   3. said algin is present in an amount of about 0.75 percent; and
   4. said phosphate is present in an amount of about 0.25 percent.

3. A product in accordance with claim 2, wherein said corn syrup solids are present in an amount of about 8 percent.

4. A product in accordance with claim 1 wherein said food-grade source of calcium comprises a member selected from the group consisting of casein and high-calcium whey solids.

5. A product in accordance with claim 4 wherein said source of calcium is present in an amount of about 1.0 percent.

6. A product in accordance with claim 1 which contains as an additional ingredient, about 0.16 percent of xanthan gum.

7. A product in accordance with claim 1 wherein said food-grade emulsifying and water-binding agent comprises lecithin.

8. A product in accordance with claim 7 wherein said lecithin is present in an amount of about 0.5 percent.

9. A dry product suitable for coating and glazing foodstuffs during the cooking thereof consisting essentially of a blend of the following ingredients:
   1. between about 54 percent and about 57 percent of a water-soluble starch hydrolyzate having a D.E. within the range of 5 and 25;
   2. between about 6 percent and about 8 percent fat;
   3. about 0.75 percent algin;
   4. about 0.25 percent of a food-grade phosphate;
   5. a sufficient amount of a food-grade source of calcium to provide between about 0.01 percent and about 0.015 percent available calcium;
   6. about 8 percent corn syrup solids;
   7. the balance of the composition comprising a member selected from the group consisting of flavoring materials and mixtures of flavoring materials and coloring materials.

10. A product in accordance with claim 9 wherein said food-grade source of calcium comprises a member selected from the group consisting of casein and high calcium whey solids.

11. A product in accordance with claim 10 wherein said source of calcium is present in an amount of about 1.0 percent.

12. A product in accordance with claim 10 which contains as an additional ingredient, about 0.5 percent of lecithin.

13. A product in accordance with claim 12 which contains as an additional ingredient, about 0.16 percent of xanthan gum.

* * * * *